United States Patent
Stuck et al.

(10) Patent No.: US 9,149,154 B1
(45) Date of Patent: Oct. 6, 2015

(54) APPARATUS FOR TRANSIENTLY HOLDING COOKED FOOD IN A WARM CONDITION PENDING SERVICE OF THE FOOD FOR CONSUMPTION

(71) Applicant: Marshall Air Systems, Inc., Charlotte, NC (US)

(72) Inventors: Robert M. Stuck, Clover, SC (US); Ronald B. Reynders, Clover, SC (US); Paul Dean Wooten, Mount Holly, NC (US)

(73) Assignee: Marshall Air Systems, Inc., Charlotte, NC (US)

( * ) Notice: Subject to any disclaimer, the term of this patent is extended or adjusted under 35 U.S.C. 154(b) by 269 days.

(21) Appl. No.: 13/783,869

(22) Filed: Mar. 4, 2013

(51) Int. Cl.
| | |
|---|---|
| A23C 3/02 | (2006.01) |
| A47J 37/08 | (2006.01) |
| F27D 11/00 | (2006.01) |
| A21B 1/00 | (2006.01) |
| A21B 1/22 | (2006.01) |
| F27D 5/00 | (2006.01) |
| A47J 39/00 | (2006.01) |

(52) U.S. Cl.
CPC .................................. A47J 39/003 (2013.01)

(58) Field of Classification Search
CPC .............................. A23L 3/365; A47J 36/2483
USPC ........... 99/331, 359–362, 367, 371, 385, 386, 99/389, 391–394, 483; 219/385, 391, 392, 219/400, 411
See application file for complete search history.

(56) References Cited

U.S. PATENT DOCUMENTS

| | | | | |
|---|---|---|---|---|
| 3,313,917 | A * | 4/1967 | Ditzler et al. ................. | 219/400 |
| 6,157,002 | A * | 12/2000 | Schjerven et al. ............ | 219/388 |
| 6,262,394 | B1 | 7/2001 | Shei et al. | |
| 7,105,779 | B2 * | 9/2006 | Shei ............................ | 219/413 |
| RE40,290 | E | 5/2008 | Shei et al. | |
| 2009/0139976 | A1 * | 6/2009 | Lee .............................. | 219/400 |

* cited by examiner

Primary Examiner — Dana Ross
Assistant Examiner — Lindsey C Teaters
(74) Attorney, Agent, or Firm — Nelson Mullins Riley & Scarborough LLP

(57) ABSTRACT

Apparatus for holding cooked food transiently in a warm condition pending service of the food, e.g., in restaurant settings, includes a housing structure defining a food holding area, and a heating device positioned adjacent the food holding area to apply radiant warming heat directly to food in the holding area. The housing structure defines a continuous air circulation path with a first portion of the path extending over the heating device and a second portion of the path extending through the food holding area. A fan is disposed outside the food holding area to produce recirculating movement of air in the air circulation path. The combination of direct radiant heating by the heating device and recirculation of air through the food holding area is effective to maintain cooked food against degradation in edibility for a period of time substantially extended beyond the heating of the cooked food alone.

8 Claims, 3 Drawing Sheets

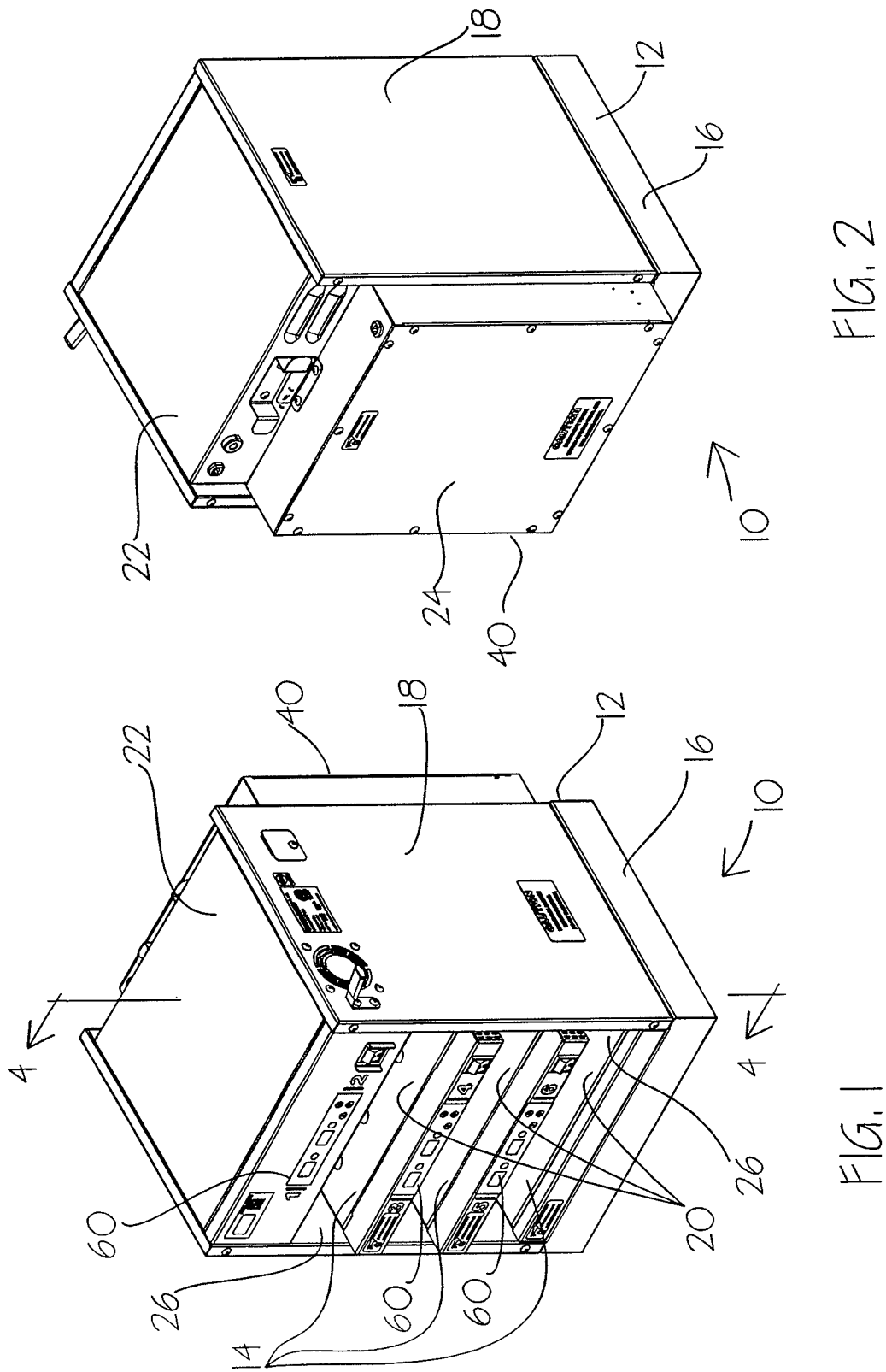

APPARATUS FOR TRANSIENTLY HOLDING COOKED FOOD IN A WARM CONDITION PENDING SERVICE OF THE FOOD FOR CONSUMPTION

FIELD OF THE INVENTION

The present invention relates generally to equipment for preparation of cooked food and, more particularly, to equipment for holding cooked food in a warm condition pending service of the food for consumption, especially in restaurants.

BACKGROUND OF THE INVENTION

In many restaurants, especially so-called "fast food" style restaurants, various food items may be cooked in advance of being ordered by a customer and then held in a warm condition until being served to a customer. This mode of operation by restaurants is intended to enable the time lapse between receiving a customer order and service of food to the customer to be reduced as much as possible. A disadvantage, however, is that after being cooked, the edible quality of food items will start to degrade after only a brief period of time. Hence, it is not uncommon for restaurants to have to discard precooked food items after a period of time if not ordered by customers. It therefore is critical for a restaurant to carefully and accurately predict customer demands for precooked food in order to maintain an acceptable level of food quality and to minimize unrecovered costs of food that must be discarded. For example, bread items such as biscuits may tend to degrade in quality after being held for about 15 minutes. French fries may have a similarly short holding time. Chicken nuggets generally cannot be held for more than 30 minutes. Accordingly, restaurants continually strive to find ways to extend the time period over which such staple precooked food items can be held without an unacceptable loss of edible quality.

SUMMARY OF THE INVENTION

The present invention seeks to provide a novel apparatus by which cooked food can be temporarily held transiently in a warm condition pending service of the food for consumption, particularly in restaurant settings.

Briefly summarized, the apparatus of the present invention basically comprises a housing structure defining a food holding area, and a heating device positioned adjacent the food holding area to apply warming heat directly radiantly to cooked food in the food holding area. The housing structure defines a continuous air circulation path with a first portion of the air circulation path extending over the heating device and a second portion of the air circulation path extending through the food holding area. A fan is disposed outside the food holding area to produce and maintain recirculating movement of air in the air circulation path. Uniquely and unexpectedly, the combination of direct radiant heating by the heating device and recirculation of air over the heating device and through the food holding area is effective to maintain cooked food against degradation in edibility for a period of time substantially extended beyond the heating of the cooked food alone.

In a contemplated embodiment, the housing may comprise a cabinet having walls generally enclosing the food holding area and defining an entrance opening into the food holding area for insertion and removal of cooked food. The heating device may include upper and lower radiant heaters above and below the food holding area, and the radiant heaters may be affixed to the cabinet walls. At least one of the cabinet walls may include perforations for flow therethrough of air in the circulation path. One of the cabinet walls may be configured to support a food holding container and may includes protuberance for supporting the food holding container at a spacing from the cabinet wall to permit flow of air therebetween. A controller may be associated with each radiant heater for selectively adjusting a temperature output thereof.

In a particular contemplated embodiment, the apparatus has a cabinet having an inner wall structure defining a generally enclosed food holding area and an entrance opening into the food holding area for insertion and removal of cooked food, and having an outer wall structure spaced from the inner wall structure for air flow therebetween. An upper heating device is affixed to an upper portion of the inner wall structure above the food holding area and a lower heating device is affixed to a lower portion of the inner wall structure below the food holding area to apply warming heat directly radiantly to opposite sides of cooked food in the food holding area. The upper portion of the inner wall structure has perforations opening into the food holding area. The inner and outer wall structures of the cabinet define a continuous air circulation path with a first portion of the air circulation path extending over the upper heating device and downwardly through the perforations, and a second portion of the air circulation path extending through the food holding area. A fan is disposed outside the food holding area in a third portion of the air circulation path between the first and second portions thereof to produce and maintain recirculating movement of air in the air circulation path. As mentioned, the combination of direct radiant heating by the heating devices and recirculation of air over the upper heating device and through the food holding area is effective to maintain cooked food against degradation in edibility for a period of time substantially extended beyond the heating of the cooked food alone.

Each heating device may advantageously comprise an infrared radiant heater and a controller may be associated with each radiant heater for selectively adjusting a temperature output thereof. The lower portion of the inner wall structure may be configured to support a food holding container and may include protuberances for supporting the food holding container at a spacing therefrom to permit flow of air between the lower portion of the inner wall structure and the food holding container. The inner wall structure may advantageously define multiple food holding areas and each food holding area may advantageously be configured to receive multiple food holding containers.

BRIEF DESCRIPTION OF THE DRAWINGS

FIG. 1 is a front perspective view of a food holding apparatus in accordance with a contemplated embodiment of the present invention;

FIG. 2 is a rear perspective view of the food holding apparatus of FIG. 1;

DETAILED DESCRIPTION OF THE PREFERRED EMBODIMENTS

Figure 3:
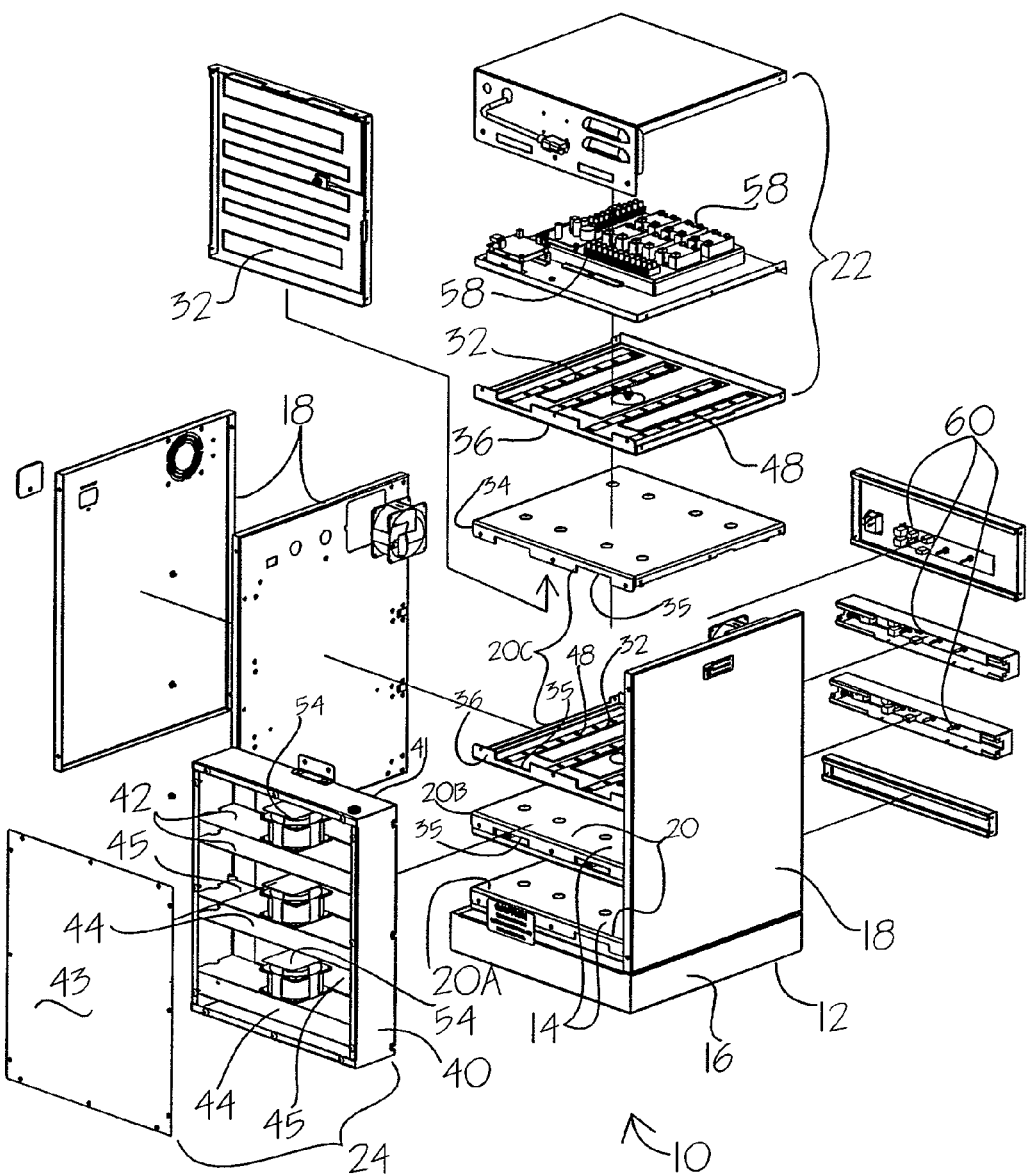
FIG. 3 is an exploded perspective view of the food holding apparatus of FIGS. 1 and 2.

Referring now to the accompanying drawings and initially to FIGS. 1 and 2, an apparatus for transiently holding cooked food in a warm condition pending service of the food for consumption is indicated overall at 10 in the form of a cabinet structure 12 defining a plurality of food holding areas 14 within the cabinet structure 12. The cabinet structure 12 includes a rectangular base 16 on the lateral sides of which side walls 18 are mounted to extend in upstanding spaced-apart parallel relation with a plurality of interior wall assemblies 20 mounted in spaced-apart parallel relation to one another transversely between the side walls 18. A superstructure 22 extends transversely between and is affixed to the upper ends of the side walls 18, and a rear wall assembly 24 is mounted to the rearward sides of the side walls 18 and to the rearward edges of the interior wall assemblies 20.

A respective food holding area 14 is thereby defined between each adjacent pair of interior wall assemblies 20 and between the uppermost interior wall assembly 20 and the superstructure 22, with each food holding area 14 being enclosed at a rearward end by the rear wall assembly 24 and being open to the forward side of the cabinet structure 12 to form respective entrance openings 26 into the food holding areas 14. Each interior wall assembly 20 thereby forms a food holding shelf, with the spacings between the interior wall assemblies 20 and between the uppermost interior wall assembly 20 and the superstructure 22 being sized to accommodate the insertion and removal of food holding containers, such as the trays 28, preferably with tray handles 30 (FIG. 4).

Figure 4:
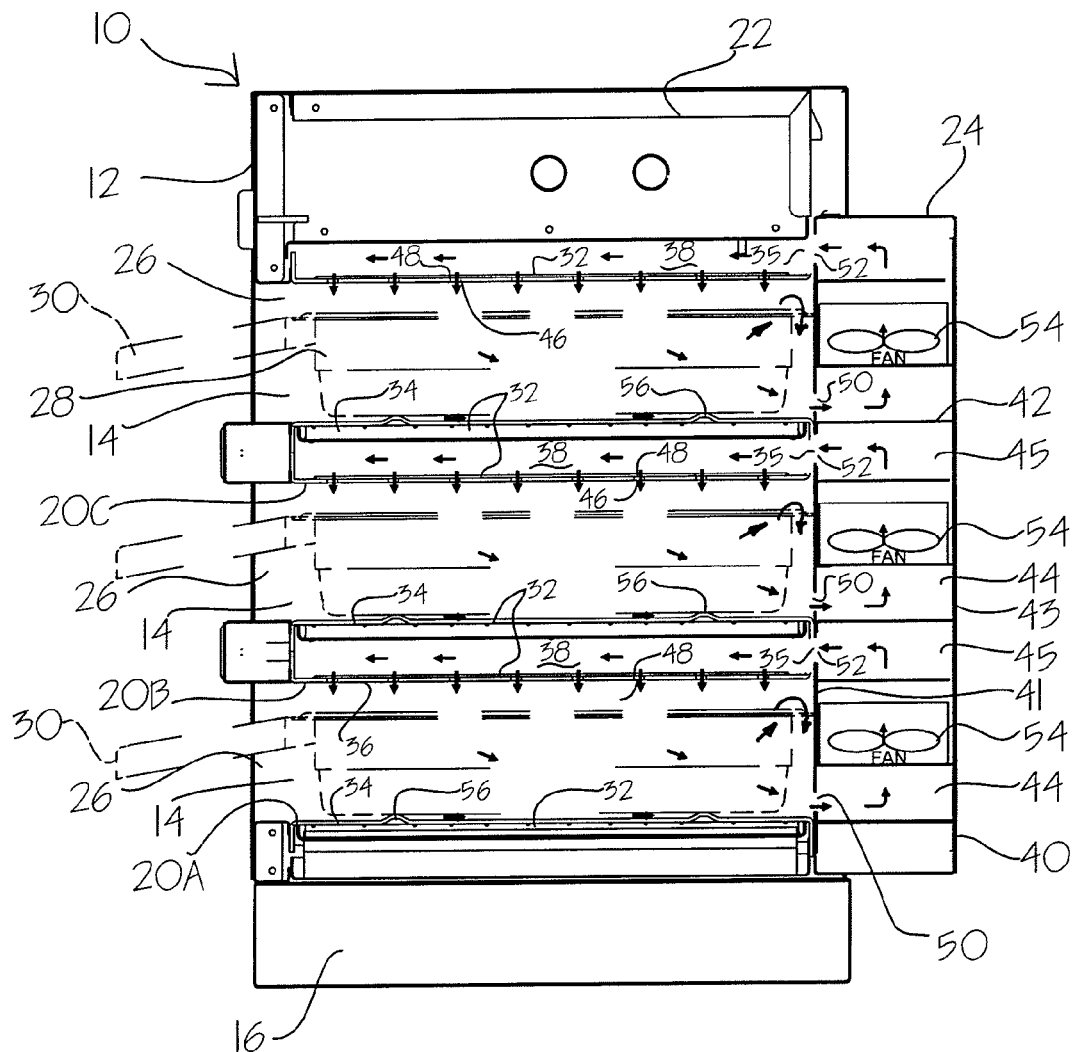
FIG. 4 is a vertical cross-sectional view through the food holding apparatus of FIGS. 1-3, taken along line 4-4 of FIG. 1.

As best seen in FIGS. 3 and 4, each interior wall assembly 20 and the superstructure 22 contain a heating device or devices 32 for generating radiant food-warming heat. The specific form and structure of the heating devices 32 may be of varying forms and types and the present invention is not limited to the use of any particular form or structure of heating device. In the contemplated embodiment, each heating device 32 is in the form of a radiant foil heater comprising a serpentine length of electrically conductive resistive heating wire sandwiched between opposing foil layers, for generating infrared radiant heat upon the application of an electric current to the heating wire. However, persons skilled in the art will readily recognize and understand that various other forms of radiant heating elements may likewise be utilized.

Each interior wall assembly 20 is formed by a pair of upper and lower heating platens 34, 36 in mated assembly defining therebetween a relatively narrow plenum 38 with one or more heating devices 32 contained within the plenum 38. The lowermost interior wall assembly 20A includes a single heating device 32 affixed to the interior surface of the upper heating platen 34. Each of the other interior wall assemblies 20B, 20C include two heating devices 32 respectively affixed to the interior surfaces of the upper and lower heating platens 34, 36. The superstructure 22 similarly includes a heating platen 36 forming the lowermost interiorly-facing side of the superstructure 22 and defining therewithin a plenum 38, with a single heating device 32 affixed to the interior side of the platen 36. Each interior wall assembly 20 is formed with slots 35 in the rearwardly facing edges of the platens 34, 36 providing airflow communication into the plenum 38 defined therein. Likewise, each lower platen 36 is formed with an array of perforations, e.g., in the form of holes 46, spaced over the surface of the platen and the heating device 32 affixed thereto is formed with a corresponding array of holes or other perforations 48 providing airflow communication between the respective plenum 38 and the adjacent food holding area 14.

The rear wall assembly 24 comprises a substantially enclosed box-shaped housing structure 40 having main inner and outer walls 41, 43 subdivided interiorly by transverse walls 42 defining a plurality of alternating interior plenums 44, 45, the plenums 44 being disposed adjacent each respective food holding area 14 and alternating with the plenums 45 which are disposed adjacent each respective interior wall assembly 20. The inner wall 41 of the rear wall housing structure 40 is formed with slots 50 which open between the food holding areas 14 and respective plenums 44 in the housing structure 40. The inner wall 41 of the housing structure 40 is also formed with slots 52 which align with the slots 35 in the respectively adjacent interior wall assemblies 20 providing airflow communication between the respective plenums 38 and 45.

A plurality of circulation fans 54 are mounted within the rear wall housing structure 40 between adjacent plenums 44, 45 to provide for air circulation in a continuous path through each food holding area 14, as indicated by directional arrows in FIG. 4. Specifically, with additional reference to FIG. 4, the intake side of each fan 54 is oriented to a respective plenum 44 to draw air through the respective slots 50 from the respective food holding area 14, and the outlet side of each fan 54 is oriented to a respective plenum 45 to blow air through the respective slots 52 into the slots 35 and therefrom into the plenum 38 in the respective interior wall assembly 20. Air discharges from each plenum 38 in the interior wall assemblies 20 downwardly through the holes 46, 48 into the respective food holding area 14 and into the food holding tray or trays 28 disposed therein. Air flow continues indefinitely in this described path of circulation for as long as the fans 54 operate. Preferably, the upper heating platen 34 of each interior wall assembly 20 is formed with protuberances 56 extending into the food holding area 14 to effectively elevate slightly the food holding tray or trays 28 resting on the interior wall assembly 20 and thereby permit air to also flow beneath the food holding tray or trays 28.

The cabinet structure 12 preferably includes a controller system, e.g., including electronic logic and circuitry components housed within the superstructure 22, as depicted only schematically at 58 in FIG. 3, and input and display units mounted to a front panel of the superstructure 22 and also to the front side of wall assemblies 20B and 20C, as schematically depicted at 60, to provide for adjustment and control of various operational parameters of the apparatus, e.g., inputting a desired setpoint temperature output of the radiant heating generated by the heating devices 32, monitoring actual temperatures, monitoring the holding time of food placed into the food holding areas, etc. For example, but without limitation, the controller system may employ RTDs (resistant temperature detectors) or thermistors attached to the radiant heating devices 32 to provide for temperature detection and control. If and as desired, the controller system may provide for separate monitoring and control of the operational parameters in different food holding areas and different zones within a given food holding area. For example, a single food holding area may be sized to receive two or more food holding containers, whereby it may be desirable to monitor and control separately the parameters relevant to each container. Various other operational criteria will be apparent to persons skilled in the art and are intended to be within the scope of the present invention.

In testing operations, the present apparatus has achieved remarkably surprising and unexpected results in maintaining the edible quality of cooked foods substantially longer than has been possible with the known apparatus and known food holding techniques. For example, conventional experience and wisdom is that fried chicken nuggets, as are commonly offered by numerous fast food restaurants, cannot be held in a warming cabinet beyond approximately 30 min. without an unacceptable deterioration in edibility. Hence, it is common practice among fast food restaurants to discard chicken nuggets if not served to customers within 30 min. after being placed into a warming or holding cabinet or like apparatus. However, in initial testing with the apparatus of the present invention, it has been possible to hold fried chicken nuggets for one hour without unacceptable deterioration in the edible quality of the nuggets. Conventional cabinets and apparatus for holding cooked food typically provide a warming environment for the food, but without any air movement. Other apparatus are known which expose cooked food to warmed air, but without the application of radiant heating to the food. Accordingly, the application to cooked food of both radiant warming heat and a circulating airflow would not necessarily be expected to achieve different or better food holding capabilities, but in particular, it would not be expected that food holding times could be as much as doubled over conventional apparatus and techniques. While testing thus far has focused on the holding of fried chicken nuggets, it is contemplated that the basic structure and operation of the present apparatus is equally adapted to the holding of various other types of cooked foods typically prepared in advance by many restaurants, e.g., French fries, biscuits, etc.

It will therefore be readily understood by those persons skilled in the art that the present invention is susceptible of broad utility and application. Many embodiments and adaptations of the present invention other than those herein described, as well as many variations, modifications and equivalent arrangements will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

What is claimed is:

1. Apparatus for transiently holding cooked food in a warm condition pending service of the food for consumption, comprising:
   a housing structure defining a food holding area,
   a heating device comprising upper and lower radiant heater platens respectively positioned in spaced-apart facing relation above and below the food holding area to apply warming heat directly radiantly to cooked food in the food holding area, the upper radiant heater platen having perforations for air passage therethrough and the lower radiant heater platen having upwardly extending support protuberances,
   the housing structure defining a continuous air circulation path with a first portion of the air circulation path extending over the upper radiant heater platen and downwardly through the perforations therein and a second portion of the defined air circulation path extending through the food holding area, and
   a fan disposed outside the food holding area and oriented to draw air from the second portion of the defined air circulation path and discharge air into the first portion of the defined air circulation path to produce and maintain unidirectional recirculating movement of air in the defined air circulation path,
   a container configured to rest in the food holding area on the protuberances of the lower radiant heater platen at a spacing therefrom, the container having an imperforate body defining an upwardly-open food holding compartment facing the upper radiant heater platen, for flow of air within the second portion of the defined air circulation path into and around the container and through the spacing between the container and the lower radiant heater platen,
   the combination of direct radiant heating by the radiant heater platens and recirculation of air unidirectionally in the air circulation path over the radiant heater platens and through the food holding area being effective to maintain cooked food against degradation in edibility for a period of time substantially extended beyond the heating of the cooked food alone.

2. The apparatus for transiently holding cooked food in a warm condition pending service of the food for consumption according to claim 1, wherein the housing structure comprises a cabinet having walls generally enclosing the food holding area and defining an entrance opening into the food holding area for insertion and removal of cooked food.

3. The apparatus for transiently holding cooked food in a warm condition pending service of the food for consumption according to claim 2, wherein the radiant heater platens are affixed to the cabinet walls.

4. The apparatus for transiently holding cooked food in a warm condition pending service of the food for consumption according to claim 2, further comprising a controller associated with each radiant heater platen for selectively adjusting a temperature output thereof.

5. Apparatus for transiently holding cooked food in a warm condition pending service of the food for consumption, comprising:
   a cabinet having an inner wall structure defining a generally enclosed food holding area and an entrance opening into the food holding area for insertion and removal of cooked food, and having an outer wall structure spaced from the inner wall structure for air flow therebetween,
   an upper heating device comprising an upper radiant heater platen affixed to an upper portion of the inner wall structure above the food holding area and a lower heating device comprising a lower radiant heater platen affixed to a lower portion of the inner wall structure below the food holding area to apply warming heat directly radiantly to opposite sides of cooked food in the food holding area,
   the upper portion of the inner wall structure and the upper radiant heater platen having perforations opening into the food holding area,
   the lower portion of the inner wall structure and the lower radiant heater platen having upwardly extending support protuberances,
   the inner and outer wall structures of the cabinet defining a continuous air circulation path with a first portion of the defined air circulation path extending over the upper heating device and downwardly through the perforations in the upper radiant heater platen, and a second portion of the defined air circulation path extending through the food holding area, and
   a fan disposed outside the food holding area in a third portion of the air circulation path between the first and second portions thereof and oriented to draw air from the second portion of the defined air circulation path and discharge air into the first portion of the defined air circulation path to produce and maintain unidirectional recirculating movement of air in the defined air circulation path,
   a container configured to rest in the food holding area on the protuberances of the lower portion of the inner wall structure and the lower radiant heater platen at a spacing therefrom, the container having an imperforate body defining an upwardly-open food holding compartment facing the upper radiant heater platen, for flow of air within the second portion of the defined air circulation path into and around the container and through the spacing between the container and the lower portion of the inner wall structure and the lower radiant heater platen, and the combination of direct radiant heating by the radiant heater platens and recirculation of air over the radiant heater platens and through the food holding area being effective to maintain cooked food against degradation in edibility for a period of time substantially extended beyond the heating of the cooked food alone.

6. The apparatus for transiently holding cooked food in a warm condition pending service of the food for consumption according to claim 5, further comprising a controller associated with each radiant heater platen for selectively adjusting a temperature output thereof.

7. The apparatus for transiently holding cooked food in a warm condition pending service of the food for consumption according to claim 5, wherein the inner wall structure defines multiple food holding areas.

8. The apparatus for transiently holding cooked food in a warm condition pending service of the food for consumption according to claim 7, wherein each food holding area is configured to receive multiple food holding containers.

\* \* \* \* \*